United States Patent [19]

Herman

[11] Patent Number: 5,281,003

[45] Date of Patent: Jan. 25, 1994

[54] BOTTOM BRACKET AXLE ASSEMBLY

[75] Inventor: William P. Herman, Marblehead, Mass.

[73] Assignee: Hsin Lung Accessories Co., Ltd., Taipei Hsien, Taiwan

[21] Appl. No.: 790,200

[22] Filed: Nov. 7, 1991

[51] Int. Cl.⁵ .............................................. B62M 3/08
[52] U.S. Cl. ................................ 301/2.5; 74/594.1; 74/594.2
[58] Field of Search ..................... 301/1, 2.5, 131, 5.1, 301/105.1, 124.1; 74/594.1, 594.2

[56] References Cited

U.S. PATENT DOCUMENTS

| 312,277 | 2/1885 | Latta | 74/594.1 X |
| 658,624 | 9/1900 | Egger | 74/594.1 |
| 3,199,922 | 8/1965 | Krenz | 301/105 B X |
| 3,453,720 | 5/1966 | Gerard | 29/480 |
| 3,673,888 | 7/1972 | Moll et al. | 74/607 |
| 3,903,754 | 9/1975 | Morroni | 74/594.1 |
| 4,768,839 | 9/1988 | Spindler | 301/124 |
| 4,810,040 | 3/1989 | Chi | 301/105 |
| 4,966,419 | 10/1990 | Cunard | 301/2.5 |

FOREIGN PATENT DOCUMENTS

| 112906 | 8/1900 | Fed. Rep. of Germany | 301/2.5 |
| 329048 | 8/1935 | Italy | 301/2.5 |
| 498930 | 11/1954 | Italy | 301/105 B |

Primary Examiner—Russell D. Stormer
Attorney, Agent, or Firm—Wolf, Greenfield & Sacks

[57] ABSTRACT

A bottom bracket axle assembly for a pedal powered vehicle provides an axle that includes a spindle at each end for engaging a pedal crank arm. Each spindle includes a bearing support for mounting the axle in a bottom bracket tube having cup-mounted bearings on each end thereof. The axle includes a hollow enlarged diameter central section that may be formed from a seamless tube. Both outer and inner diameters of the central section are greater than an outer diameter of each spindle outward of its bearing supports and the outer diameter of the central section may be sized so that it substantially equals the inner diameter of the cups and bottom bracket. In this instance, a clearance is provided between the inner diameter of the cups and outer diameter of the central section so that free rotation may occur therebetween.

21 Claims, 4 Drawing Sheets

BOTTOM BRACKET AXLE ASSEMBLY

FIELD OF INVENTION

This invention relates to a bottom bracket axle assembly for use with pedal cranks of bicycles and other pedal powered vehicles.

BACKGROUND OF THE INVENTION

It has become increasingly desirable to construct components for bicycles and other pedal powered vehicles having reduced weight while maintaining or enhancing component strength. Designers have paid increased attention to the pedal crank assembly that transmits power from the legs of the rider to the wheels of the bicycle. This assembly experiences extreme stress both in torsion and bending. This stress is largely cyclic and, thus, bottom bracket assemblies must retain sufficient strength to resist fatigue failure.

Designers of pedal powered vehicles have generally constructed pedal crank axles for bottom brackets as a single, approximately uniform diameter shaft. An example of such a prior art shaft is depicted generally in FIG. 1. The shaft 10 has tapered spindles 12 at either end that project from the bottom bracket (not shown). The center 14 of the shaft 10 is, as noted, of roughly similar diameter to these spindles 12 and passes through the interior of the bottom bracket. The bottom bracket supports the shaft by means of bearings (not shown) positioned in end caps or cups proximate each spindle. In general, one cup is axially fixed while the other includes a locking ring for axial adjustment. The bearings generally used are unsealed balls that are positioned about the circumference of the shaft and directly engage radiused shoulders 16 of an increased diameter section 18 machined on to each side of the shaft. In this manner, the shaft 10 is held axially and radially within the bottom bracket. Since ball bearings are positioned between the axle shaft outer diameter and inner circumference of the bottom bracket, there is a substantial difference between the inner diameter of the bottom bracket and the smaller outer diameter of the shaft.

In conventional designs of bottom bracket axles, the center portion of the solid axle shaft is of similar diameter as the outwardly positioned spindles and merely extends through the hollow central portion of the bottom bracket with substantial radial space between the shaft outer diameter and bottom bracket inner diameter. This space is largely wasted while a heavy and relatively thick central axle section is needed to provide adequate strength.

A further disadvantage of conventional bottom bracket axle designs is that they must have sufficient shaft strength to resist torsional, bending and cyclic loads. As a result such shafts, which are generally formed of steel alloy, are rather heavy.

These conventional designs also do not adapt well to modern light-weight materials such as titanium. Shafts constructed in the conventional manner (with a conventional narrow central section) from titanium have proven flexible or whip like under torsional loading and their shoulders have experienced undue wear in contact with ball bearings.

SUMMARY OF INVENTION

Accordingly, it is an object of this invention to provide a bottom bracket axle assembly having lighter weight than a conventional design while maintaining or enhancing bending, torsional and fatigue strength.

It is another object of this invention to provide a bottom bracket axle assembly utilizing improved bearing systems between the bottom bracket and the axle shaft.

It is yet another object of this invention to provide a bottom bracket axle assembly that may be constructed easily.

It is yet another object of this invention to provide a bottom bracket axle assembly that performs favorably when constructed from high-strength light-weight materials such as titanium.

It is still another object of this invention to provide a bottom bracket axle assembly having an axle that is compatible with a conventional bottom bracket configuration.

A bottom bracket axle assembly for a pedal powered vehicle according to this invention features an axle mounted in a somewhat conventional bottom bracket tube that includes retaining cups at each end with bearings for support of the axle. The axle is formed with a pair of spindles having pedal crank mounting elements at their outward ends. The inner portion of the spindles include bearing support surfaces which may be conventional in design for standard exposed bearings or may, alternatively, comprise a cylindrical shoulder for use with a fully sealed ball bearing. The spindles have, alone their length outward of the bearing supports, a given maximum diameter that is relatively conventional. Inward of the bearing supports, however, the spindles are enlarged in diameter to form a cross section that substantially fills the inner volume of the bottom bracket tube. Slight clearance is given for rotation of the spindles within the cups and bracket tube. The central enlarged diameter portions of the spindles are joined by a hollow tube which be a seamless steel tube according to one embodiment. This tube is joined to each spindle via TIG welds or similar permanent joining methods. The welds themselves are formed so that they will not radially project to interfere with rotation of the axle in the bottom bracket.

The spindles may also be drilled with axially positioned through holes in order to relieve stress concentrations. All or part of the bottom bracket axle assembly may alternatively be constructed of titanium according to this invention, resulting in substantially reduced weight and adequate torsional rigidity.

BRIEF DESCRIPTION OF THE DRAWINGS

These and other objects and advantages of the present invention will become more apparent with reference to the following detailed description of the preferred embodiment and brief description of the drawings in which.

DETAILED DESCRIPTION OF THE PREFERRED EMBODIMENT

Figure 2:
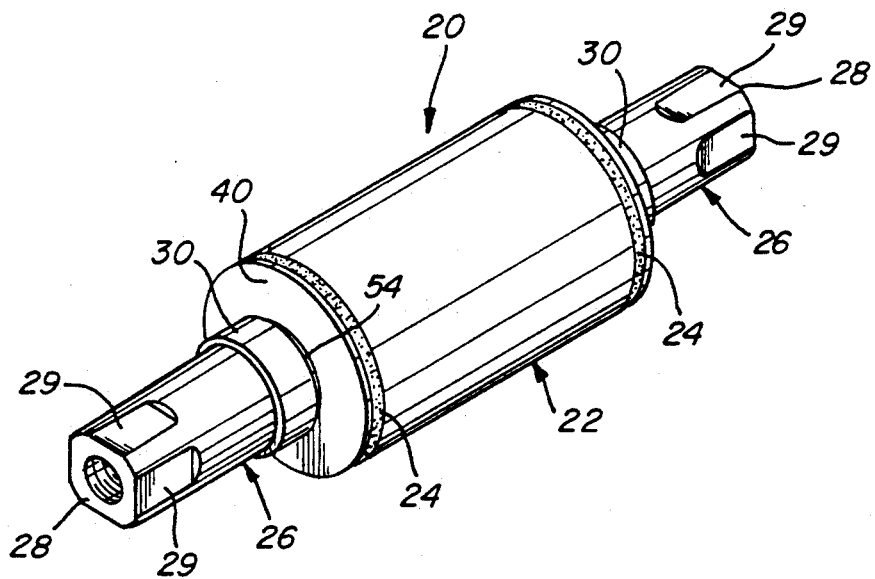
FIG. 2 is a perspective view of a bottom bracket axle according to the preferred embodiment.

FIG. 2 details a bottom bracket axle 20 according to the preferred embodiment of this invention. Unlike prior art bottom bracket axles, the axle according to this invention includes a central section 22 that is substantially larger in diameter. This central section 22 is hollow, being formed in this embodiment of one millimeter thickness seamless tube of 4130 chromolly steel heat treated to HRC 30 following all welding, if any. The central section 22 is joined by TIG welds 24 at each end to a machined spindle 26 also formed of 4130 chromolly steel (hardened to HRC 54 after all welding is accomplished thereto) and having outward ends 28 having flats 29 adapted to accept conventional pedal crank arms (not shown) found, for example, on a bicycle. The spindles 26 may be machined from bar stock or forged and then finished by machining. The spindles 26 differ from many common designs in that, rather than carrying a radiused support shoulder for direct contact with exposed ball bearings, the spindles carry a generally straight cylindrical shoulder 30 for supporting a sealed bearing.

Figure 3:
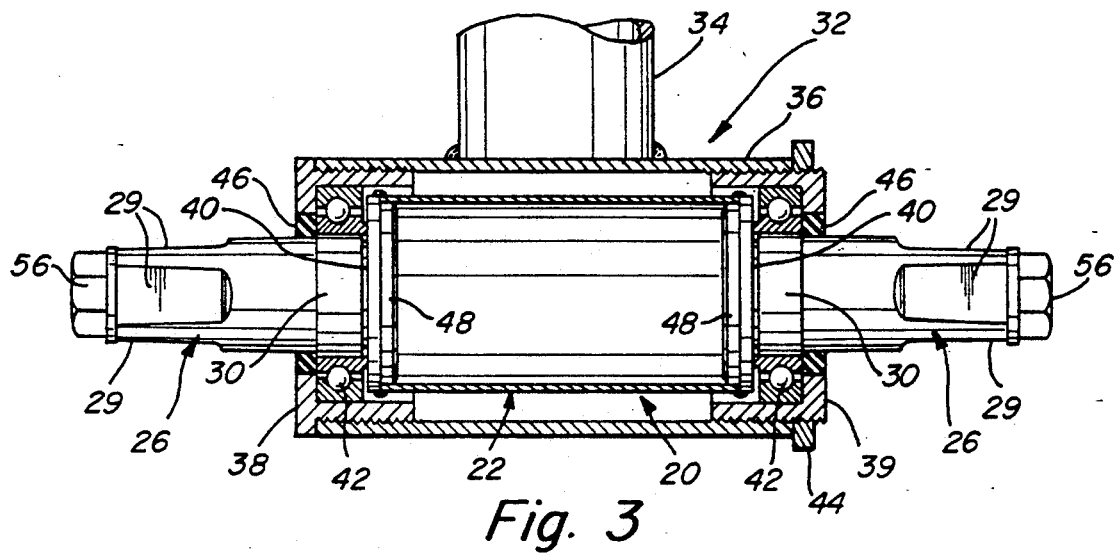
FIG. 3 is a cross sectional side view of the bottom bracket axle of FIG. 2 installed in a bottom bracket.

FIG. 3 details a full bottom bracket assembly 32 attached to a bicycle down-tube 34 in cross-section. The bottom bracket axle 20 is retained axially within the bottom bracket tube 36 by means of threaded cups 38 and 39 positioned at both ends of the tube 36 that engage substantially planar base walls 40 (see also FIG. 2) of the spindles 26. The cups 38, 39 in this embodiment are conventional, but serve to house fully sealed ball bearings 42 that engage the straight cylindrical support shoulders 30 on the spindles. The bearings may be partially sealed but should have cylindrical outer races and cylindrical inner races that conform to the diameter of the cups and axle bearing support shoulders respectively according to this embodiment. Sealed ball bearings having an inner race diameter of 17.5 mm may be used according to this embodiment.

Since steel cups may be utilized according to this invention, the sealed bearings 42 may be seated directly against their inner circumference with a close tolerance fit. However, it may be preferred to utilize aluminum cups for reduced weight. In this instance, it may be desirable to add a shim or sleeve of hardened steel or similar material around the inner diameter of each cup where it engages the sealed ball bearing. In this way, undue wear is minimized.

As depicted in FIG. 3, the outer diameter of the central section 22 of the bottom bracket axle 20 is only slightly smaller than the inner diameter of the bottom bracket tube 36 and is substantially equal in diameter to the inner diameter of the (smaller diameter) cups 38, 39. In this embodiment, the central section outer diameter is approximately 28.6 mm. Such a diameter allows sufficient clearance for the central section 22 and associated TIG welds 24 for joining the central section 22 to its spindles 26. While the cups 38, 39 generally carry a somewhat smaller than the bottom bracket tube 36 it shall be assumed that the term "substantially equal" as used herein means that the outer diameter of the central section is just small enough in diameter to rotate freely in an assembled bottom bracket having cups and bearings.

Unlike prior art designs, the axle according to this embodiment carries a central section outer diameter that substantially fills the volume of the bottom bracket tube 36. Use of such a larger central section diameter endows the axle with similar torsional strength to solid center mass prior art designs while employing a substantially thinner walled structure that serves to lighten axle weight substantially. As noted, the axle design according to this invention still allows the use of conventional cups including at least one adjustable cup 39 having a locking ring 44 and also allows the use of standard outer sealing rings 46 that engage the spindles to prevent infiltration of foreign matter into the bottom bracket interior.

Figure 4:
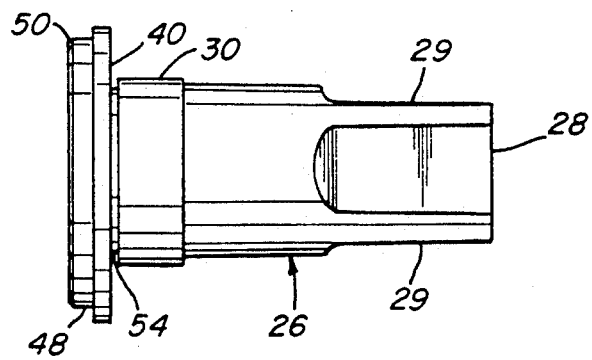
FIG. 4 is a more detailed side view of a spindle for use in the bottom bracket axle of FIG. 2.
Figure 5:
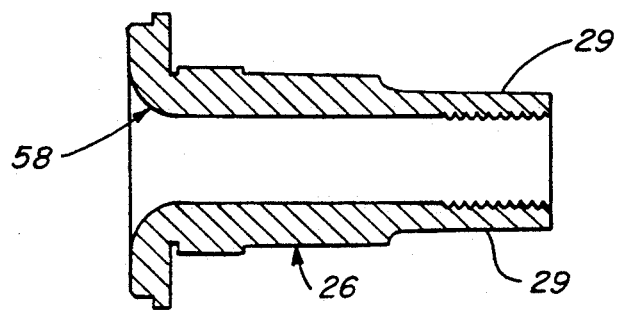
FIG. 5 is a cross-sectional side view of the spindle of FIG. 4.

The spindles 26 are further detailed in FIGS. 4 and 5. As shown in FIG. 4, the spindle 26 includes a smaller diameter shoulder 48 along its inwardmost side that allows it to be centered squarely within the end of the central section tube for accurate welding. Since the shoulder 48 is not contemplated as a load-bearing element, its size should be minimized to reduce weight. In this example, a 1.5 mm shoulder extension is sufficient to allow seating of the spindle 26 into the central section tube for welding. The weld provides the primary strength to the spindle/axle assembly. For ease of assembly, the shoulder may include on its edge a 0.5 mm×45° chamfer 50.

The spindle 26 extends to a length that is similar to other conventional designs. In this example, the total length of the spindle 26 is 39.8 mm while the crank arm alignment flats 29 are 15.2 mm wide taken axially along the spindle. A small 0.5 mm radius relief 54 is cut between the spindle base wall 40 and bearing shoulder 30 in order to prevent binding of components and to provide for uninterrupted grinding of the bearing support shoulder to an accurate diameter. Note that such final grinding generally occurs subsequent to all welding and hardening operations upon the spindle. The shoulder 30 is 17.5 mm in diameter and extends axially a width of 6.5 mm according to this embodiment. Each spindle end, according to this embodiment, is drilled and threaded for a conventional M8×1 screw 56 (FIG. 3) for retaining a respective pedal crank arm. It should be noted that the right spindle (looking forwardly on a bicycle) generally extends axially approximately 2 mm further than the left spindle to accommodate the drive sprocket and other asymmetrically placed components.

FIG. 5 further details the spindle 26 of this embodiment in cross section. The spindle is drilled fully through and the inward facing side of the spindle is bell shaped 58. Material has been removed from the inward-facing side where not needed to reduce weight and remove stress concentrations proximate the spindle's joint with the central section tube. Prior art designs often include only a partially drilled through hole serving primarily to receive the crank arm screw. Stress concentrations, thus, result at the termination of the hole within the spindle resulting in spindle failure at this location. Since such failure usually occurs outboard of the cup, the crank arm tends to fall completely off the bicycle upon failure, thus, damaging components and potentially injuring the rider. No stress concentrations exist within the inner wall of the spindle at these intermediate locations according to this embodiment. Thus, if failure were to occur, it would more likely occur upon the axle within the interior bottom bracket itself. The cups would prevent the unbroken spindle from falling out of the bottom bracket due to engagement of the base wall with the cup.

Figure 1:
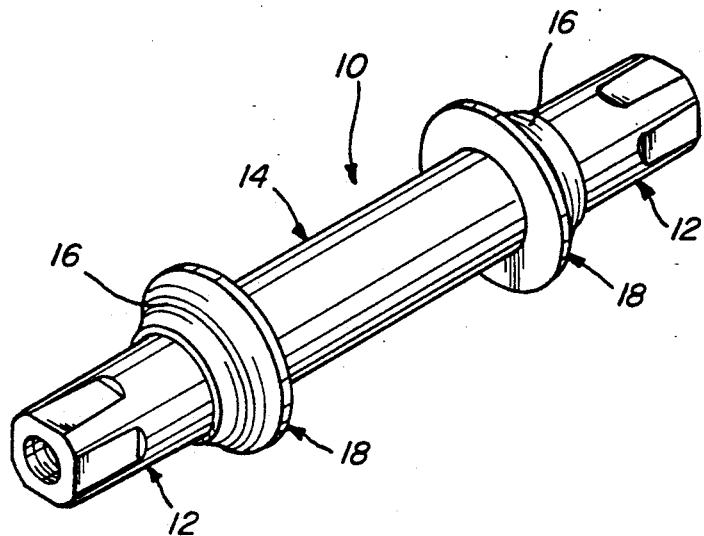
FIG. 1 is a perspective view of a conventional bottom bracket axle according to the prior art.
Figure 6:
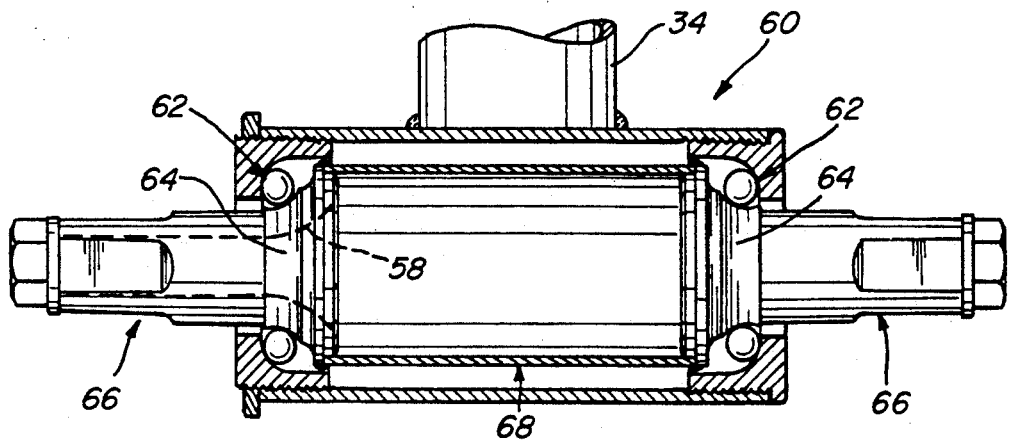
FIG. 6 is a cross-sectional side view of an alternative embodiment of a bottom bracket axle assembly according to this invention.

FIG. 6 details an alternative embodiment of a bottom bracket assembly 60 according to this invention employing more conventional cups and bearings 62. The bearings 62 according to this embodiment, are unsealed ¼×11 ball bearings held circumferentially in place by a conventional ball bearing circumferential retainer (not shown). The bearings engage a radiused shoulder 64 upon each spindle 66 that is roughly similar to that found in the conventional axle such as that shown in FIG. 1.

This design still retains the advantage of an enlarged hollow center section 68 for reduced weight and increased torsional strength. Such a design may also include seals similar to those shown in FIG. 3 positioned upon the outer cup orifice and also inner sealing rings (not shown) disposed between the bearings and the spindle base wall.

Figure 7:
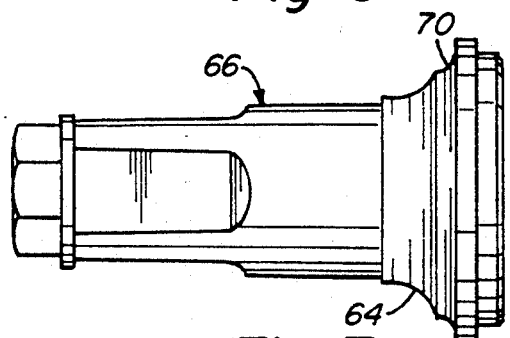
FIG. 7 is a more detailed side view of a spindle for use with the bottom bracket axle assembly of FIG. 6.

FIG. 7 more clearly details a spindle 66 according to the embodiment of FIG. 6. The radiused bearing shoulder 64 according to this embodiment is conventionally sized having a width of 5.6 mm taken axially. An additional radiused shoulder 70 extending axially 1.5 mm is positioned between the bearing shoulder and the spindle base wall. It is preferred in each of the embodiments discussed herein to avoid any sharp corners between spindle sections. By eliminating sharp corners, no stress concentrations that could contribute to failure are present.

Figure 8:
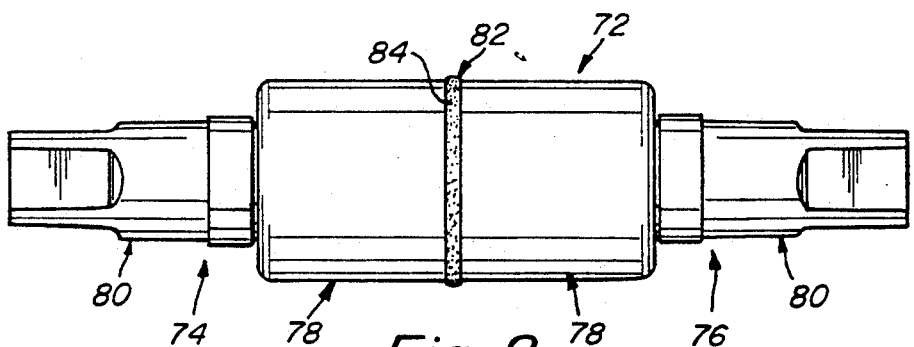
FIG. 8 is a more detailed side view of another method of forming the bottom bracket axle of FIG. 2.

While joining of a single central section tube to machined end spindles by welding ma have certain strength and manufacturing advantages, is equally possible to form a bottom bracket axle according to this invention from only two pieces joined together along their length. Such a configuration is depicted in FIG. 8. The bottom bracket axle 72 is divided into left and right halves 74 and 76, respectively, that are each formed as single pieces including a hollow center portion 78 and an end spindle 80. Forging, machining or a combination of these processes may be used to create each half. The halves may then be joined 82 along their center by a circumferential TIG weld 84.

Figure 9:
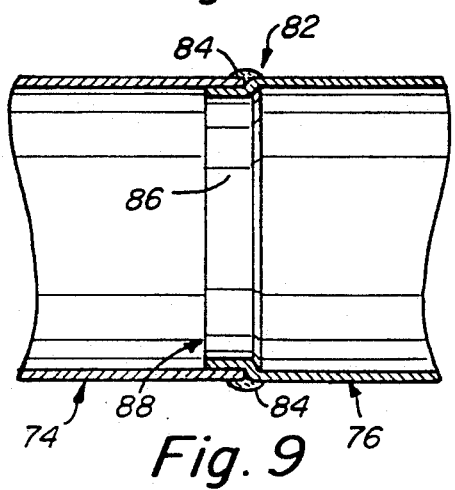
FIG. 9 is a more detailed cross sectional side view of the joint between section halves in the bottom bracket axle of FIG. 8.

FIG. 9 particularly details the joint 82 between halves 74,76 according to FIG. 8. The right half 76 is swaged at its free end to form a narrower neck 86 that is press-fit into the unaltered free end 88 of the left axle half 74. The two sections may then be TIG welded 84 around their circumference in a conventional manner.

Figure 10:
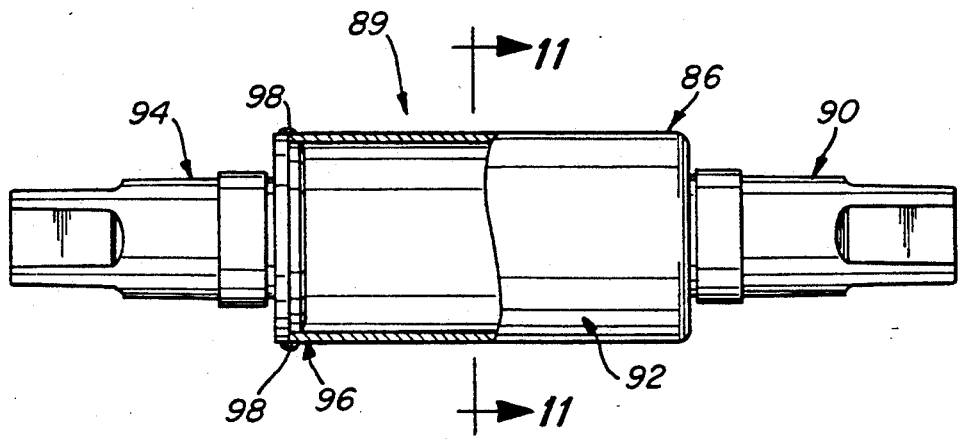
FIG. 10 details yet another method of forming the bottom bracket axle of FIG. 2.

Another possible method of manufacturing an axle bracket according to this invention from only two pieces is depicted in FIG. 10 in a partial cross-section. The right hand portion 86 of the axle 89 includes both the spindle 90 and the entire central hollow portion 92. Again, this section may be formed by forging, machining or a combination of processes. A left hand spindle 94 similar to that shown in FIGS. 3-5 for the preferred embodiment may then be attached to the free end 96 of the tube of the right hand portion 86. Following fitting, the spindle 94 may then be TIG welded 98 permanently to the right hand portion tube.

Figure 11:
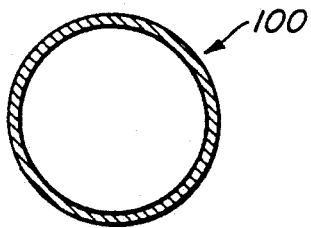
FIG. 11 is a side view of one possible cross-section of the central region of the bottom bracket axle of FIG. 10 taken along line II—II.
Figure 12:
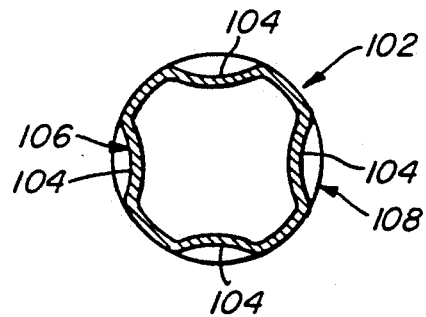
FIG. 12 is a side view of a second possible cross section for the the bottom bracket axle of FIG. 10 taken along line II—II.

While the embodiment of FIG. 10, or any other embodiment according to this invention, may have a central section defining a circular cross-section 100 such as that shown in FIG. 11, it is equally possible to form the central section with a non circular cross-section. In certain applications non circular cross sections may be desirable along some portion of the central section. One such cross-section is depicted in FIG. 12. The middle region of the central section 102 has been pressed inwardly 104 at four 90° positions to form an undulating surface 106. The ends closest to the spindles have remained circular 108 for attachment to the spindles. It is important according to this invention primarily that the central section be large enough in diameter to take advantage of the weight/material savings possible with the larger diameter tube that may be accommodated by the bottom bracket tube.

Each of the embodiments discussed herein may be implemented using a variety of materials. The dimensions discussed are appropriate for hardened 4130 chromolly steel alloy spindle and heat treated tubular central sections, but corresponding dimensions may be derived for other light-weight materials such as certain aluminum alloy and even titanium.

As noted previously, one disadvantage of bottom bracket axle designs according to the prior art is that a central shaft having a somewhat small diameter is prone to torsional flexure when constructed from titanium. Additionally, titanium ball bearing support shoulders are not sufficiently strong to withstand wear from continuous loading. Owing to the expense of titanium this rapid wear, in fact, proves a rather significant problem. Implementing a axle bracket according to this invention from titanium material, in all or in part, would entail significant weight savings with fewer or none of the problems encountered in the prior art. Since a tube carries a higher torsional moment and may withstand torsional flexure more readily than a central small diameter shaft, the structure is ideal for titanium. Additionally, since sealed ball bearings are utilized according to a preferred embodiment, no ball-to-axle contact occurs. Thus, wear of the axle itself is largely minimized and the wear is, instead, experienced almost entirely by easily replaceable sealed ball bearings. Therefore, implementing an axle bracket according to this invention in titanium may result in an extremely light weight, strong and wear resistant component.

The preceding has been a detailed description of the preferred embodiments. Many modifications, additions and alternatives are possible without departing from the spirit and scope of this invention. This description is meant only to detail some possible embodiments and is not meant in any way to limit the invention. Rather, it should be taken by way of example and be limited only by the appended claims.

What is claimed is:

1. A bottom bracket axle assembly for a pedal powered vehicle comprising:
    an axle having a pair of spindles positioned at each end thereof, the spindles including flats for engaging pedal crank arms thereon and the spindles also including shoulders positioned axially inward remote from the pedal crank flats for supporting bottom bracket axle bearings for rotation of the axle relative to a bottom bracket, the spindles having a maximum first diameter at the shoulders and a second diameter section that is greater in diameter than the maximum first diameter, the second diameter section positioned axially inward of the shoulders the second diameter section defining an axially outward facing wall that limits axial movement of the spindles relative to the bearings; and a hollow central tubular section permanently joined to each of the second diameter sections of the spindles, the central section defining a cylinder having at all points axially therealong an outer diameter and an inner diameter that are each greater than the maximum first diameter of each of the shoulders of the spindles.

2. A bottom bracket axle assembly as set forth in claim 1 wherein the central section is joined to each of the spindles at the second diameter of each of the spindles by circumferential welds.

3. A bottom bracket axle assembly as set forth in claim 1 further comprising a bottom bracket tube having ends, the ends thereof having cups for retaining the axle and the bearings axially therein.

4. A bottom bracket axle assembly as set forth in claim 1 wherein the bearings comprise unsealed ball bearings and the shoulders comprise radiused shoulders.

5. A bottom bracket axle assembly as set forth in claim 1 wherein the bearings comprise sealed ball bearings and the shoulders comprise cylindrical shoulders sized to engage an inner race of sealed ball bearings.

6. A bottom bracket axle assembly as set forth in claim 1 wherein the central section comprises a pair of central section portions of predetermined axial length, each of the portions having a spindle attached thereto and each of the portions being joined at an end thereof opposite each spindle to each other by a weld.

7. A bottom bracket axle assembly as set forth in claim 1 wherein at least one of the central section and the spindles comprises titanium.

8. A bottom bracket axle assembly as set forth in claim 1 wherein each of the spindles is hollow along an axial direction.

9. A bottom bracket axle assembly comprising:
a bottom bracket tube having an inner diameter and a retaining cup at each end thereof;
a bearing positioned within each cup and facing inwardly of the bottom bracket tube;
an axle having a pair of spindles each having crank pedal engagement means extending outwardly of each cup, the spindles further including bearing engagement means; and
the axle further including a central section positioned within the bottom bracket tube and joining each of the spindles together, the central section being hollow and having outer and inner diameters that are each greater than an outer diameter of the spindle a all points outward of the bearing engagement means.

10. A bottom bracket axle assembly as set forth in claim 9 wherein the outer diameter of the central section is substantially equal to an inner diameter of the cups and the bottom bracket tube, the outer diameter including a clearance to allow rotation of the axle relative to the bottom bracket tube and the cups.

11. A bottom bracket axle assembly as set forth in claim 10 wherein the axle comprises titanium.

12. A bottom bracket axle assembly as set forth in claim 10 wherein the bearings comprise sealed ball bearings and the bearing engagement means comprises a cylindrical shoulder for engagement with an inner race of the sealed ball bearings.

13. A bottom bracket axle assembly as set forth in claim 12 wherein the bearing engagement means includes a substantial planar shoulder for axially engaging an inward facing side of the sealed ball bearings.

14. A bottom bracket axle assembly as set forth in claim 13 wherein each of the central section and spindles comprises 4130 steel alloy.

15. A bottom bracket axle assembly as set forth in claim 14 wherein the central section comprises a seamless tube having a thickness of 1 mm and an outer diameter of no less than 28 mm.

16. A bottom bracket axle assembly as set forth in claim 15 wherein at least one of the spindles includes a circumferential weld for joining the spindle to the seamless tube.

17. A bottom bracket axle assembly comprising:
a bottom bracket axle tube;
an axle assembly;
cups positioned at each end of the axle tube, the cups including bearings for radially and axially retaining the axle within the tube and for allowing rotation of the axle relative to the tube;
the axle assembly including a pair of spindles having outwardly positioned pedal crank mounting flats and having shoulders that contact the bearings; and
the axle further including a tubular central section joined to each of the spindles at positions axially inwardly of the shoulders and spanning an interior portion of the bottom bracket tube, the central section having an inner diameter and an outer diameter that are larger than a diameter of the shoulders, the outer diameter comprising at all points axially therealong a maximum outer diameter that is approximately equal to an adjacent minimum inner diameter of at least one of the cups and the bottom bracket axle tube.

18. A bottom bracket axle assembly as set forth in claim 17 wherein the bearings are sealed ball bearings and the shoulders are cylindrical shoulders positioned upon each of the spindles.

19. A bottom bracket axle assembly as set forth in claim 17 wherein each of the spindles is hollow along an axial direction across its entire axial length.

20. A bottom bracket axle assembly as set forth in claim 19 wherein each of the spindles includes a flared opening along the axial direction that widens in a direction towards the central section.

21. A bottom bracket axle assembly comprising:
a bottom bracket axle tube having a predetermined inner diameter, the tube having opposing ends, the ends each having a cup thereon for carrying a bearing;
an axle having a pair of spindles with shoulders for engaging the bearings and shafts having structures for engaging pedal cranks, the shafts having structures extending outwardly from the cups, the shafts having a maximum first diameter and the shoulders having a maximum second diameter that is larger than the maximum first diameter;
the spindles further including a maximum third diameter section that is larger than each of the maximum first and maximum second diameters, the third diameter sections being positioned inwardly of the shoulders and being joined to a hollow tubular member, the tubular member having an outer diameter and an inner diameter, each of the outer and inner diameter being larger than the maximum first diameter and maximum second diameter.

* * * * *